United States Patent
McKendry (12)

(10) Patent No.: US 8,671,701 B2
(45) Date of Patent: Mar. 18, 2014

(54) METHODS TO STORE HUMAN BREAST MILK

(75) Inventor: Bruce P. McKendry, Benicia, CA (US)

(73) Assignee: L. Jason Clute, Alamo, CA (US)

( * ) Notice: Subject to any disclaimer, the term of this patent is extended or adjusted under 35 U.S.C. 154(b) by 1750 days.

(21) Appl. No.: 11/724,815

(22) Filed: Mar. 15, 2007

(65) Prior Publication Data

US 2008/0228134 A1  Sep. 18, 2008

(51) Int. Cl.
F25C 1/00  (2006.01)

(52) U.S. Cl.
USPC .................................................. 62/66

(58) Field of Classification Search
USPC ............ 62/66; 206/524.8; 215/11.1; 604/74
See application file for complete search history.

(56) References Cited

U.S. PATENT DOCUMENTS

| | | | |
|---|---|---|---|
| 602,315 A | | 4/1898 | Fernandez |
| 2,054,065 A | | 9/1936 | Ayers et al. |
| 4,501,585 A | * | 2/1985 | Friedman ..................... 604/346 |
| 5,121,590 A | * | 6/1992 | Scanlan ........................ 53/510 |
| 5,358,476 A | * | 10/1994 | Wilson ........................... 604/74 |
| 5,450,963 A | * | 9/1995 | Carson ....................... 206/524.8 |
| 5,457,939 A | | 10/1995 | Bardou et al. |
| 6,207,213 B1 | * | 3/2001 | Groux et al. ................. 426/516 |
| 6,231,907 B1 | | 5/2001 | Kino et al. |
| 6,759,071 B2 | * | 7/2004 | Nye et al. ..................... 426/394 |
| 6,770,314 B1 | | 8/2004 | Scott et al. |
| 6,910,594 B2 | * | 6/2005 | Foley et al. .................. 215/11.1 |
| 6,974,439 B1 | | 12/2005 | McKendry |
| 2003/0236491 A1 | * | 12/2003 | McKendry et al. ............ 604/74 |
| 2005/0074342 A1 | * | 4/2005 | Lemme et al. ................ 417/415 |

OTHER PUBLICATIONS

Albala-Hurtado, et al., In "Determination of Water-Soluble Vitamins in Infant Milk By High-Performance Liquid Chromatography", Journal of Chromatography, 1997, 778:247-253.
Chavez-Servin et al., In "Simultaneous Analysis of Vitamins A and E In Infant Chromatography-Diode Array Detection Using a Short Narrow-Bore Column", Journal of Chromatography, 2006, 1122:138.143.
Romeu-Nadal, et al., In "Rapid High-Performance Liquid Chromatographic Method for Vitamin C Determination in Human Milk Versus An Enzymatic Method", Journal of Chromatography, 2006, 830:41-46.
Turoli, D., Testolin G., Zanini R., and Bellu R., "Determination of Oxidative Status In Breast and Formula Milk", Acta Paediatr, 2001, 90(7):813-5.

(Continued)

Primary Examiner — Frantz Jules
Assistant Examiner — Emmanuel Duke
(74) Attorney, Agent, or Firm — R. Michael West

(57) ABSTRACT

Methods for storing human breast milk, preserving its natural flavor and nutritional content. Through the use of an apparatus such as a breast pump, breast milk is expressed from a lactating woman. The milk is transferred through a fill line into a storage container. After the container is substantially filled with breast milk, the fill line is decoupled from the breast pump output, and a vacuum is applied to the line. After the remaining air is evacuated from the container, an isolation valve in the fill line is closed, sealing the container in an evacuated condition. The fill line is removed from the valve, and the container is placed into a freezer or refrigerator for storage. When ready for use, the container is removed from the freezer or refrigerator, the milk is thawed, and the vacuum is broken, allowing removal of the milk for transfer to a bottle.

20 Claims, 1 Drawing Sheet

(56) References Cited

OTHER PUBLICATIONS

Whited, L.J., Hammond, B.H., Chapman, K.W., and Boor, K.J., "Vitamin A Degradation and Light-Oxidized Flavor Defects In Milk.", *J. Dairy Sci.*, 200, 85:351-354, 2002.

Friel, J., Martin, S., Langdon, Herzberg, G. and Buettner, G., "Milk From Mothers of Both Premature and Full-Term Infants Provides Better Antioxidant Protection Than Does Infant Formula", *Pediatric Research*, vol. 51, No. 5, 2002, 612-618.

\* cited by examiner

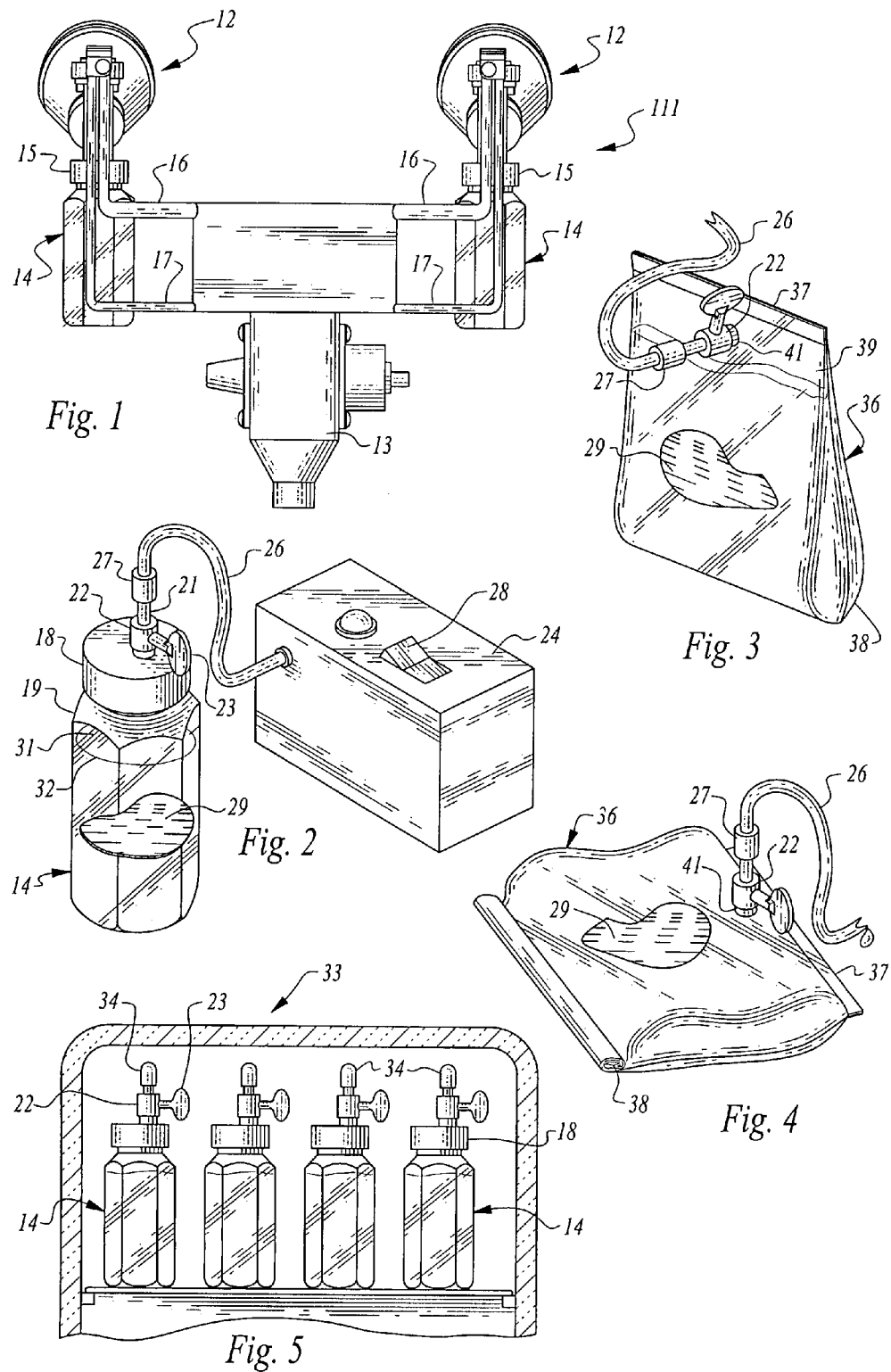

METHODS TO STORE HUMAN BREAST MILK

BACKGROUND OF THE INVENTION

1. Field of the Invention

The invention relates generally to methods for the storage of milk for later consumption. More particularly, the invention pertains to methods for storing expressed human breast milk, in which the milk is first contained in a substantially oxygen free environment, and then frozen or refrigerated until such time that the milk is needed for consumption.

2. Description of the Prior Art

It was noted in a U.S. Department of Labor, Bureau of Labor Statistics report, that as of January, 2003, over 60% of the women in the United States worked outside the home. A percentage of these women has infants, and these women have elected to feed their infants with breast milk, rather than the more convenient, but less nutritious, formula milk. One reason for providing expressed milk to an infant is the anti-oxidant properties of human milk in the form of vitamins. It is recognized that fresh human milk has a higher anti-oxidant capacity than prepared infant formula.

Owing to the apparent time constraints that an outside the home job imposes, breast feeding mothers in the workforce have turned to the storage of their breast milk for infant feeding at a later, more convenient time and circumstance. This is accomplished by utilizing a breast pumping device which expresses the breast milk into a storage container. An example of such a breast pumping device is disclosed in U.S. Pat. No. 6,974,439, issued to McKendry, the inventor herein. After using such a device, the container of expressed breast milk is typically stored in a refrigerated or a frozen state for use at a later time.

One of the problems associated with milk storage, whether at freezing or at refrigerator temperatures, is the change in color, odor, and taste, over time. Infants are very sensitive to such changes, and often simply refuse to consume the milk after it has been stored. Milk, including human breast milk, contains lipids which are susceptible to oxidation. Turoli, et al., reported that breast milk is subject to strong peroxidation, either at room temperature, or at −20 degrees C. See, Turoli, D., Testolin G., Zanini R., and Bellu R., *Determination Of Oxidative Status In Breast And Formula Milk*, Acta Paediatr, 2001, 90(7):813-5.

It was therefore hypothesized by the inventor herein, that if oxygen could be removed from a sealed storage container of human breast milk prior to storage at sub-freezing temperatures or even refrigerator temperatures, the flavor or taste of the milk might better be maintained for subsequent consumption. This hypothesis was tested and confirmed as correct, through taste testing of the stored milk using infants as the judges. In addition, laboratory analysis of the stored milk established that unexpected and surprising advantages are provided by using this process. Not only did the methods taught herein retain the natural flavor of the breast milk, but also it has been confirmed that the nutritional qualities of the milk were also preserved. A disclosure of the methods developed and the results of the laboratory testing confirming the efficacy of the methods, are all set forth in greater detail below.

SUMMARY OF THE INVENTION

The present invention pertains to methods for storing human breast milk which preserve its natural flavor and its nutritional content. Using an apparatus such as a breast pump, a quantity of breast milk is expressed from a lactating woman and transferred into a sealable storage container. The container may be either rigid or flexible, but preferably it has a transparent sidewall so the level of the contained milk may be observed. After the container volume is substantially filled with breast milk, there is an airspace, or a volume of air, above the upper surface of the contained milk.

A vacuum is applied to this volume in the upper portion of the container to remove substantially all of the air and the included oxygen. After the air is evacuated from the container, an isolation valve is manually closed or a check valve automatically closes, sealing the container in an evacuated condition.

The container is then placed into a freezer for storage. When the time comes to consume the milk, the container is removed from the freezer and thawed. The vacuum in the container is broken, and the milk is warmed to a suitable temperature for consumption by an infant. A nipple cap may be applied directly to the container, or the milk may be transferred to a baby bottle for feeding.

It has also been determined that employing the same method, but merely refrigerating the container and the breast milk at normal refrigerator temperatures also provides enhanced preservation of the natural flavor and nutritional attributes of the milk, but for a shorter period of time than that provided by freezing the milk.

BRIEF DESCRIPTION OF THE DRAWINGS

FIG. 1 is a rear elevational view of a prior art breast pump apparatus, with its output line connected to the input port of a rigid storage container;

FIG. 2 is a perspective view of a rigid storage container, an evacuation line, and a vacuum pump;

FIG. 3 is a perspective view of a flexible bag storage container and an evacuation line;

FIG. 4 is a perspective view of a flexible bag storage container being partially rolled from one end to expel any contained air and oxygen; and, FIG. 5 is a fragmentary elevational view of a freezing compartment, with the door broken away, showing a plurality of the evacuated storage containers containing frozen human breast milk.

DETAILED DESCRIPTION OF THE PREFERRED EMBODIMENT

Turning now to the drawings, a prior art breast pump 11 for expressing human breast milk includes a pair of milk expressors 12 and a pump 13. Beneath each expressor 12 is a milk storage container 14, depicted in FIG. 1 as a rigid bottle preferably made from a transparent plastic material. Each storage container 14 has a threadably affixed removable cap 15, adapted to be coupled to a respective expressor 12. For the purpose of facilitating the expression of milk, vacuum lines 16 and air pressure lines 17 extend from the pump 13 to each expressor 12. The structure and operational features of breast pump 11 are explained more fully in U.S. Pat. No. 6,974,439, which is hereby incorporated by reference.

After a desired quantity of breast milk has been expressed into storage containers 14, the containers are removed from the breast pump 11. In one manner of carrying out the method of the present invention, each cap 15 is removed and replaced by a seal cap 18. Seal cap 18 is screwed over external threads (not shown) of the open, upper end 19 of container 14. Seal cap 18 includes a container line 21 and an isolation valve 22. Valve 22 has one end in fluid communication with line 21 and another end in fluid communication with the underside of seal cap 18. A knob 23 is provided to allow convenient hand manipulation of valve 22 from open to close positions. Seal cap 18 also includes a gasket (not shown), positioned between its underside and the upper end 19 of container 14, capable of providing an airtight seal between cap 18 and container 14.

It should be pointed out that the container 14 used to collect milk expressed through the use of breast pump 11, may be used to transfer the collected milk to another container before further steps of the storage process are carried out. However, for the sake of simplicity, it is preferred that the same container used to collect the expressed milk is also used to store the milk.

As shown in FIG. 2, a vacuum pump 24 and a vacuum line 26 are provided. A coupler 27 detachably interconnects vacuum line 26 with container line 21. Vacuum pump 24 may be powered by a small electric motor, actuated by depressing rocker switch 28. Other pumps, for example, a hand-actuated manual pump could also be substituted to provide a vacuum. The manual pump could readily be connected to vacuum line 26 in lieu of vacuum pump 24.

At this point, the volume of the container 14 is at least partially filled with expressed milk 29, leaving an airspace 31, or volume of air, above an upper surface 32 of the contained milk. The airspace 31 must be substantially evacuated of all contained air and included oxygen, to carry out the process successfully. To that end, with isolation valve 22 in an open position, vacuum pump 24 is actuated until a partial vacuum is achieved. Next, knob 23 is turned, moving isolation valve 22 into a closed position and effectively hermetically sealing container 14 in its evacuated state.

It should also be noted that in lieu of the external isolation valve 22, a check valve (not shown) may be provided either in the container line or integral with the seal cap 18. Use of a check valve may be more convenient in some applications, as its operation is automatic. When a vacuum is drawn by the pump, the check valve will act to seal the container and maintain the vacuum therein after the container line is detached. And, a vacuum release mechanism within the check valve will allow the user to release the vacuum when the seal cap is removed after storage.

After the valve 22 is manually closed, coupler 27 and vacuum line 26 are detached from line 21, and the container 14 is ready to be transferred to a freezer 33, as shown in FIG. 5. A protective cover 34, may be placed over the exposed end of line 21, to prevent contamination of the line. Containers 14 are stored in freezer 33 at below freezing temperatures, preferably to a temperature of at least −10 degrees C.

Laboratory testing has determined that breast milk may be frozen for a considerable length of time, up to forty (40) or more days, and the advantages of the present method still preserve the natural taste and nutritional qualities of the milk. When the time arrives for the frozen milk to be consumed, the container 14 is removed from the freezer 33 and thawed until the milk is in a liquid state. The vacuum in the container 14 is then broken, by opening the isolation valve 22 or releasing a check valve in the container line or within the cap itself. The milk is then warmed to a suitable temperature, preferably at least ambient room temperature, for consumption by an infant. A nipple cap may be applied directly to the container, or the milk may be transferred to a baby bottle for feeding.

It has also been determined that employing the same method, but merely refrigerating the container and the breast milk at normal refrigerator temperatures also provides enhanced preservation of the natural flavor and nutritional attributes of the milk, but for a shorter period of time than that provided by freezing the milk. Normal refrigerator temperatures may range from 0.5° C. to 11° C. or so. Laboratory testing has confirmed that human breast milk stored at normal refrigerator temperatures using the methods disclosed above, will retain its quality for at least two days.

Alternative methods for carrying out the invention are disclosed in FIGS. 3 and 4. In FIG. 3, a flexible container 36 is provided, having an upper end 37 and a lower end 38. Flexible container 36 may be manufactured from a transparent, flexible plastic, inexpensive enough to be disposable, for one-time use. Container 36 has a port 41 at its upper end 37, for convenient snap-coupling or thread coupling to valve 22. Vacuum line 26 extends from valve 22 to a supply of milk for filling, and to a vacuum pump 24, or the like, for drawing a vacuum on container 36. As shown in FIG. 3, after a quantity of expressed milk substantially fills the container 36, airspace 39 remains. The vacuum pump removes the air and the contained oxygen from airspace 39, before valve 22 is turned off to seal the container 36 prior to freezing or refrigerating same.

The container 36 shown in FIG. 4 is identical to that described above, but the method used to remove air and oxygen is different. After the container 36 is substantially filled with milk 29, the vacuum line 26 is detached from the source of milk. Then, the user partially rolls up the lower end 38 of the container, to expel all contained air out line 26. Lastly, valve 22 is closed to maintain the container 36 as completely filled with milk, and therefore substantially devoid of any air or oxygen.

Coupler 27 and line 26 are then removed from valve 22, and the container 36 is ready for freezing or refrigeration. In all other respects, the subsequent storage and utilization of the contained milk is the same for flexible container 36, as for rigid container 14. However, because container 36 is inexpensive and difficult to clean and sterilize after use, it will likely be a disposable container, rather than a container capable of repeated uses, as container 14.

Taste testing, using infants as the judges, has confirmed that human breast milk stored using the above-described methods is not rejected for degradation in odor or taste. The stored milk was accepted and consumed as readily as fresh milk. However, further laboratory testing was undertaken to determine why this was the case. The procedures employed and the results obtained are set forth below.

Testing Procedure

Fresh, mature, human breast milk, donated by eight women with healthy infants and typical American diets, was used for the analysis and testing. Infant formula from powder and liquid was also analyzed. Baseline analysis of each sample was completed within twenty-four (24) hours of collection for Vitamins A, C, E, B1, B2, and B3. Each sample was divided into two sets, set "S" representing standard storage methods, and set "V" representing the vacuum storage methods following the teachings of the present invention, with aliquots of one (1) ounce each. Sufficient aliquots for each set were made for testing at different storage periods, corresponding to ten (10) days, twenty (20) days, and forty (40) days.

A twenty (20) ml sample was removed from each aliquot and tested for the nutrients of interest. Half of the samples were then vacuum sealed in their containers and placed in a freezer having a temperature of −20° C. The other half of the samples were sealed with ambient air remaining in their containers and placed in the freezer at −20° C. After ten (10) days, one aliquot from each group was removed for analysis. Similarly, at twenty (20) days and at forty (40) days, the same process was repeated.

Vitamin A and E content were analyzed using High-Performance Liquid Chromatography ("HPLC") using a process described by Chavez-Servin et al., in *Simultaneous Analysis Of Vitamins A And E In Infant Chromatography-Diode Array Detection Using A Short Narrow-Bore Column, Journal of Chromatography*, 2006, 1122:138.143. Prior to testing, the samples were briefly immersed in warm water (40° C.) to thaw them, then mixed using a vortex to provide a homogeneous sample. One ml of the sample was transferred to a centrifuge tube and 3 mls of ethanol were added. The samples were then mechanically shaken and 1 ml of hexane was added. The sample so modified was shaken further for another minute. After resting the samples for five (5) minutes, 3 mls of saturated NaCl were added to aid separation. The mixture was next shaken by inversion. The samples were then centrifuged for five (5) minutes at 3000 rpm at room temperature. The hexane phase was recovered and directly filtered through a 0.22 um nylon filter and collected in a 1 ml amber glass vial. A twenty ul sample was injected into the HPLC system for analysis.

Vitamin C content was analyzed using HPLC described by Romeu-Nadal, et al., in *Rapid High-Performance Liquid Chromatographic Method For Vitamin C Determination In Human Milk Versus An Enzymatic Method, Journal of Chromatography*, 2006, 830:41-46. The samples were protected from light by wrapping tubes and flasks with aluminum foil and preparing the samples in a darkened room. Three hundred (300) ul of milk mixed with three hundred (300) ul of 0.56% meta-phosphoric acid solution were added to the same centrifuge and filtration tube, which was shaken for thirty (30) seconds and centrifuged at 10° C. (10 minutes, 3000 rpm). Ascorbic acid was identified by comparing the retention time of the sample peak with that of the ascorbic standard at 254 nm. Quantification was carried out using external standardization.

Vitamin B1, B2, and B3 were analyzed using HPLC as described by Albala-Hurtado, et al., in *Determination Of Water-Soluble Vitamins In Infant Milk By High-Performance Liquid Chromatography, Journal of Chromatography*, 1997, 778:247-253. The samples were protected from light by wrapping the tubes and flasks with aluminum foil and preparing the samples in a darkened room. Ten and one-half (10½) grams of sample were weighed into a fifty (50) ml centrifuge tube. One (1) gram of trichloroacetic acid ("TCA") solid and a magnetic stirring bar were added. The mixture was stirred for ten (10) minutes at 1250 g in a centrifuge to separate the two phases. Three (3) ml of 4% TCA was added to the solid residue obtained and mixed for ten (10) minutes and then centrifuged. The solid phase was discarded. The two acid extracts were combined in a ten (10) ml volumetric flask and the volume was filled with 4% TCA. Acid extracts were filtered through a 0.45 um filter and injected into the HPLC system for analysis.

The above described testing processes were repeated for fresh milk stored under refrigeration for forty-eight (48) hours, with measurement of nutrients occurring at twelve (12), twenty-four (24), and forty-eight (48) hour intervals.

Descriptive statistics were calculated and nutrient mean values were compared using paired t-tests. Statistical significance was determined when $p \leq 0.01$.

Results

The Baseline Values ("B/L") for each sample and nutrient are listed in TABLE 1. These values are highly variable, as would be expected in Human Milk ("HM"). The Infant Formula ("IF") nutrient values are generally higher than the Human Milk values, owing to vitamin fortification. The range for Vitamin A values was 197 mcg/L in Human Milk, to a high of 1277 mcg/L in Infant Formula. For Vitamin E, the lowest level was 0.879 mg/ml to a high level of 4.672 mg/ml. The Vitamin C levels ranged from 32 mg/ml to a high of 87 mg/ml. The range for Vitamin B1 was 0.032 mg/ml to 0.676 mg/ml. The range for Vitamin B2 was 0.156 mg/ml to 1.015 mg/ml. And, the range for Vitamin B3 was 1.25 mg/ml to 7.10 mg/ml.

The Baseline Values (B/L) of Fresh Human Milk and Infant Formula by nutrient and by sample are set forth below in TABLE 1.

TABLE 1

|  | A (mcg/L) | E (mg/L) | C (mg/L) | $B_1$ (mg/L) | $B_2$ (mg/L) | $B_3$ (mg/L) |
|---|---|---|---|---|---|---|
| HM1 | 478 | 2.201 | 51 | 0.123 | 0.348 | 3.29 |
| HM2 | 764 | 3.252 | 87 | 0.185 | 0.511 | 5.33 |
| HM3 | 197 | 1.632 | 32 | 0.091 | 0.221 | 1.25 |
| HM4 | 308 | 4.485 | 89 | 0.082 | 0.456 | 2.61 |
| HM5 | 604 | 2.865 | 68 | 0.103 | 0.198 | 4.28 |
| HM6 | 236 | 1.683 | 44 | 0.032 | 0.156 | 1.86 |
| HM7 | 289 | 0.879 | 44 | 0.054 | 0.237 | 2.04 |
| HM8 | 404 | 1.768 | 50 | 0.096 | 0.396 | 1.94 |
| IF1 | 607 | 3.251 | 61 | 0.676 | 1.015 | 7.10 |
| IF2 | 1277 | 4.672 | 81 | 0.554 | 0.945 | 6.76 |
| Average | 516 | 2.669 | 61 | 0.200 | 0.448 | 3.65 |

The Baseline Values and the final values for the S Group and the V Group at Baseline and after 40 days of freezing time are listed below in TABLE 2.

TABLE 2

|  | A (mcg/L) | | | E (mg/L) | | | C (mg/L) | | | $B_1$ (mg/L) | | | $B_2$ (mg/L) | | | $B_3$ (mg/L) | | |
|---|---|---|---|---|---|---|---|---|---|---|---|---|---|---|---|---|---|---|
|  | B/L | S40 | V40 | B/L | S40 | V40 | B/L | S40 | V40 | B/L | S40 | V40 | B/L | S40 | V40 | B/L | S40 | V40 |
| HM1 | 478 | 337 | 591 | 2.201 | 1.372 | 1.932 | 51 | 0 | 21 | 0.123 | 0.035 | 0.062 | 0.348 | 0.204 | 0.236 | 3.29 | 1.32 | 1.68 |
| HM2 | 764 | 602 | 737 | 3.252 | 2.799 | 2.901 | 87 | 28 | 68 | 0.185 | 0.119 | 0.147 | 0.511 | 0.362 | 0.425 | 5.33 | 4.09 | 4.86 |
| HM3 | 197 | 179 | 185 | 1.632 | 1.480 | 1.501 | 32 | 0 | 20 | 0.091 | 0.000 | 0.068 | 0.221 | 0.065 | 0.186 | 1.25 | 0.54 | 0.95 |
| HM4 | 308 | 267 | 297 | 4.485 | 4.201 | 4.398 | 89 | 46 | 71 | 0.082 | 0.048 | 0.068 | 0.456 | 0.389 | 0.401 | 2.61 | 2.01 | 2.02 |
| HM5 | 604 | 512 | 587 | 2.865 | 2.611 | 2.811 | 68 | 32 | 56 | 0.103 | 0.059 | 0.082 | 0.198 | 0.132 | 0.169 | 4.28 | 3.68 | 4.01 |
| HM6 | 236 | 219 | 212 | 1.683 | 1.599 | 1.536 | 44 | 0 | 28 | 0.032 | 0.000 | 0.000 | 0.156 | 0.111 | 0.109 | 1.86 | 1.21 | 1.49 |
| HM7 | 289 | 272 | 277 | 0.879 | 0.738 | 0.777 | 44 | 0 | 30 | 0.054 | 0.020 | 0.041 | 0.237 | 0.145 | 0.200 | 2.04 | 1.31 | 1.79 |
| HM8 | 404 | 341 | 383 | 1.768 | 1.517 | 1.602 | 50 | 36 | 31 | 0.096 | 0.075 | 0.068 | 0.396 | 0.342 | 0.359 | 1.94 | 1.41 | 1.52 |
| IF1 | 607 | 407 | 487 | 3.251 | 2.266 | 2.358 | 61 | 38 | 41 | 0.676 | 0.476 | 0.496 | 1.015 | 0.821 | 0.901 | 7.10 | 6.489 | 6.564 |
| IF2 | 1277 | 964 | 1038 | 4.672 | 3.001 | 3.581 | 81 | 0 | 54 | 0.554 | 0.359 | 0.486 | 0.945 | 0.699 | 0.703 | 6.76 | 5.680 | 5.897 |
| Average | 516 | 420 | 479 | 2.669 | 2.158 | 2.340 | 61 | 63 | 42 | 0.200 | 0.119 | 0.152 | 0.448 | 0.327 | 0.369 | 3.65 | 2.774 | 3.078 |

B/L = BASELINE

Owing to the high variability of the values for Human Milk, the mean values were used for comparison. The decrease in the levels of Vitamins A, E, C, B1, B2, and B3 was greater in the S group than in the V group, and this decrease was statistically significant.

The mean values for the Human Milk samples at Baseline, after 10 days of freezing, after 20 days of freezing, and after 40 days of freezing, are depicted below in TABLE 3.

TABLE 3

| Vitamin | Baseline | 10 Days | | 20 Days | | 40 Days | |
|---|---|---|---|---|---|---|---|
| | | S Group | V Group | S Group | V Group | S Group | V Group |
| A IU/ml | 1.366 | 1.254* | 1.224 | 1.199 | 1.386 | 1.137 | 1.361 |
| E mcg/ml | 2.346 | 2.222* | 2.243 | 2.159* | 2.243 | 2.040 | 2.182 |
| C mg/ml | 0.058 | 0.041 | 0.052 | 0.034 | 0.047 | 0.018 | 0.041 |
| $B_1$ mcg/ml | 0.096 | 0.073* | 0.088 | 0.064* | 0.080 | 0.045 | 0.067* |
| $B_2$ mcg/ml | 0.315 | 0.281# | 0.300 | 0.255# | 0.286 | 0.219 | 0.261# |
| $B_3$ mcg/ml | 0.283 | 0.249* | 0.267 | 0.233* | 0.246 | 0.195 | 0.229 |

*Statistically significantly below baseline at $p \leq 0.01$
Statistically significantly below baseline at $p \leq 0.001$ For the samples that were refrigerated, the nutrient levels were higher in the V Group than in the S Group. Each time-point measurement indicated consistent decreases in the level of all nutrients in the S Group compared to a slight decrease in the V Group. While the differences noted in the refrigeration testing were not statistically different, there was practical meaning in the differences, as they were consistent and distinguishable between the two Groups.

Discussion

All of the nutrient levels dropped for the duration of the time in storage for both Groups, but consistently less in the V Group. For example, at Baseline Values, most subjects had adequate levels of Vitamin A and C to meet the Referenced Daily Intake ("RDI") for their infant. However, by the end of forty (40) days of storage of the milk at sub-freezing temperatures, not all samples contained the RDI for Vitamin C of 50 mg/day for infants of less than 1 year of age. In particular, Vitamin C content from the S Group was reduced to non-detectable levels in four of the Human Milk samples by the last measurement, while the V Group all had detectable levels. Nutrients were better preserved by vacuum sealing, prior to storage under freezing or refrigerator temperatures, providing nutrient levels at or near the RDI for infants under the age of 1 year.

Women around the world are storing their milk frozen for utilization at later times in a more convenient way, particularly where they are separated from their infants and breastfeeding is simply impossible. Providing a vacuum storage method and system, such as that described above, offers significant improvement over current storage methods. As shown by the data presented above, the vacuum sealing of milk, in combination especially with subsequent freezing of the milk, significantly improves the preservation of natural taste and nutrients in human milk and is superior to current methods of storage for that milk.

What is claimed is:

1. A method for storing expressed human breast milk comprising the steps of:
   a. obtaining a quantity of human breast milk;
   b. transferring said quantity of milk into a rigid container having an open, upper end, until a volume of said container is at least partially filled with milk, leaving an airspace in said container above an upper surface of said milk, said airspace extending from said upper surface to said upper end;
   c. evacuating said airspace, so that substantially all ambient air and included oxygen is removed therefrom;
   d. hermetically sealing said evacuated airspace within said container from atmospheric pressure by sealing said upper end of said container; and,
   e. freezing said container and said contained human breast milk, and maintaining said human breast milk in a frozen state until it is to be consumed.

2. The method of claim 1 further including the step of warming said frozen container and said contained human milk until said milk becomes liquid.

3. The method of claim 2 further including the step of opening said upper end of said container to atmospheric pressure for consumption of said milk.

4. The method of claim 1 in which said container is substantially filled with said human breast milk, so as to minimize said airspace.

5. The method of claim 1 in which said upper end of said container is hermetically sealed with a removable seal cap, said cap including a container line and an isolation valve, said valve having one end in fluid communication with said container line and another end in fluid communication with an underside of said seal cap.

6. The method of claim 1 in which said container and said contained human milk are frozen to a temperature of at least −10 degrees C.

7. A method for storing expressed human breast milk comprising the steps of:
   a. obtaining a quantity of human breast milk using a breast pump;
   b. transferring said quantity of milk into a rigid storage container having an open, upper end, until a volume of said storage container is at least partially filled with milk, leaving an airspace in said container above an upper surface of said milk, said airspace extending from said upper surface to said upper end;
   c. evacuating said airspace, so that substantially all ambient air and included oxygen is removed therefrom;
   d. hermetically sealing said evacuated airspace within said storage container from atmospheric pressure by sealing said upper end of said container; and,
   e. freezing said container and said contained human breast milk, and maintaining said human breast milk in a frozen state until it is to be consumed.

8. The method as in of claim 7 further including the step of warming said frozen container and said contained human milk until said milk becomes liquid.

9. The method of claim 8 further including the step of opening said upper end of said container to atmospheric pressure for consumption of said milk.

10. The method of claim 7 in which said container is substantially filled with said human breast milk, so as to minimize said airspace.

11. The method of claim 7 in which said upper end of said container is hermetically sealed with a removable seal cap, said cap including a container line and an isolation valve, said valve having one end in fluid communication with said container line and another end in fluid communication with an underside of said seal cap.

12. The method of claim 7 in which said container and said contained human milk are frozen to a temperature of at least −10 degrees C.

13. A method for storing expressed human breast milk comprising the steps of:
 a. obtaining a quantity of human breast milk;
 b. transferring said quantity of milk into a rigid container having an open, upper end, until a volume of said container is at least partially filled with milk, leaving an airspace in said container above an upper surface of said milk, said airspace extending from said upper surface to said upper end;
 c. evacuating said airspace, so that substantially all ambient air and included oxygen is removed therefrom;
 d. hermetically sealing said evacuated airspace within said container from atmospheric pressure by sealing said upper end of said container; and,
 e. reducing the temperature of said container and said contained human breast milk to a lowered temperature within the range of about 0.5° C. to 11° C., and maintaining said human breast milk at said lowered temperature until it is to be consumed.

14. The method of claim 13 further including the step of warming said container and said contained human breast milk from said lowered temperature to at least an ambient room temperature.

15. The method of claim 14 further including the step of opening said upper end of said container to atmospheric pressure for consumption of said milk.

16. The method as in of claim 13 in which said container is substantially filled with said human breast milk, so as to minimize said airspace.

17. The method of claim 13 in which said upper end of said container is hermetically sealed with a removable seal cap, said cap including a container line and an isolation valve, said valve having one end in fluid communication with said container line and another end in fluid communication with an underside of said seal cap.

18. A method for storing expressed human breast milk comprising the steps of:
 a. obtaining a quantity of human breast milk using a breast pump;
 b. transferring said quantity of milk into a rigid storage container having an open, upper end, until a volume of said storage container is at least partially filled with milk, leaving an airspace in said container above an upper surface of said milk, said airspace extending from said upper surface to said upper end;
 c. evacuating said airspace, so that substantially all ambient air and included oxygen is removed therefrom;
 d. hermetically sealing said evacuated airspace within said storage container from atmospheric pressure by sealing said upper end of said container; and,
 e. reducing the temperature of said storage container and said contained human breast milk to a lowered temperature within the range of about 0.5° C. to 11° C., and maintaining said human breast milk at said lowered temperature until it is to be consumed.

19. The method of claim 18 further including the step of warming said storage container and said contained human breast milk from said lowered temperature to at least an ambient room temperature.

20. The method of claim 19 further including the step of opening said upper end of said container to atmospheric pressure for consumption of said milk.

\* \* \* \* \*